Patented Jan. 17, 1939

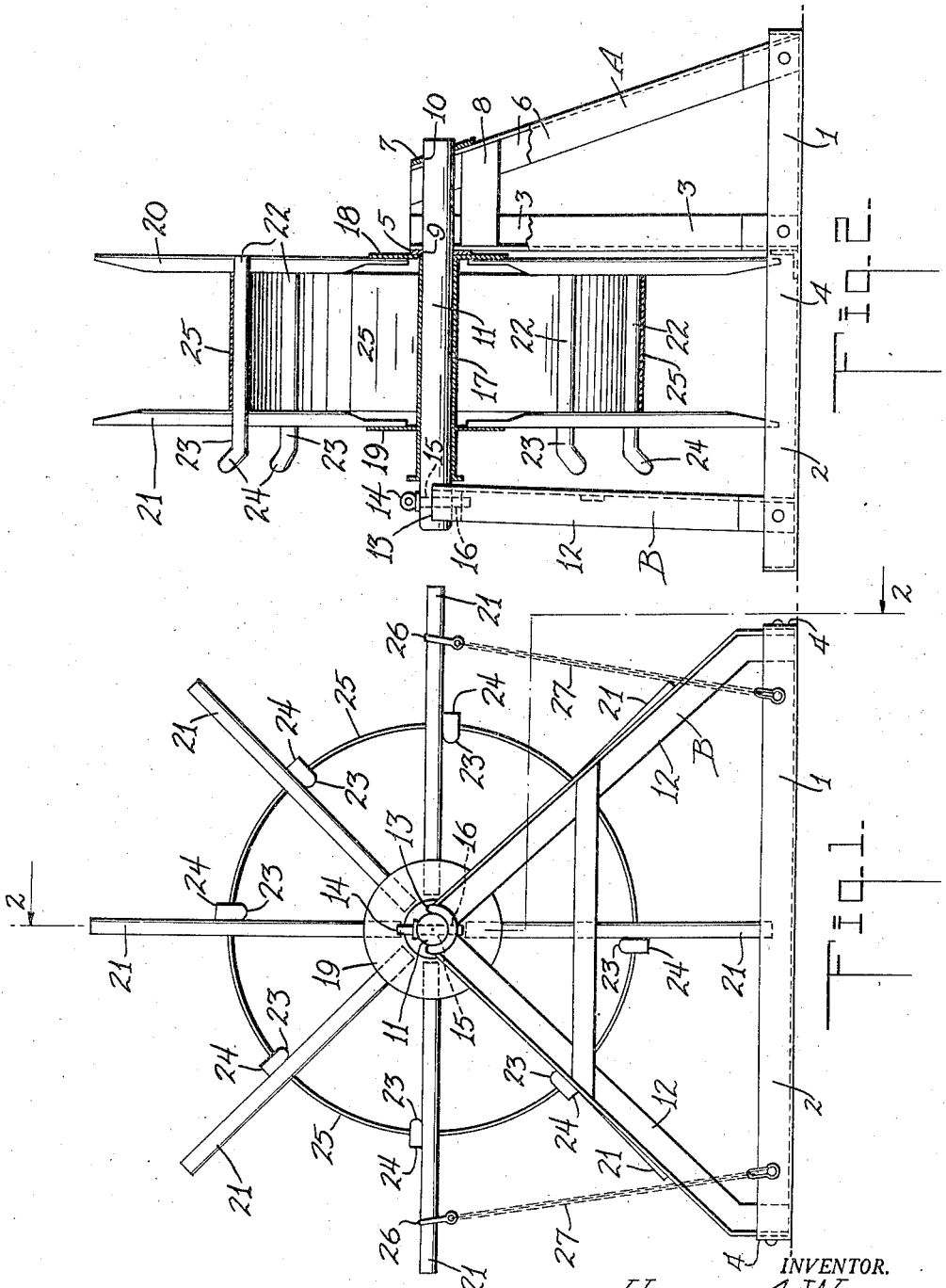

2,144,094

UNITED STATES PATENT OFFICE 2,144,094

STORAGE SPOOL

Henry Allyn Wood, Berkeley, Calif.

Application September 7, 1937, Serial No. 162,589

5 Claims. (Cl. 242—77)

My invention relates to improvements in a storage spool, and it consists of the combinations, constructions and arrangements hereinafter described and claimed.

This application is a continuation in part of my co-pending application Serial No. 122,968, filed January 29, 1937. In the co-pending case, I show a storage spool in combination with a cable or rope snubber and clamp. The storage spool or reel is designed to house all of the unused portion of the rope or cable and to be ready to feed this portion into the derrick lines when necessary.

An object of my invention is to provide a storage reel which is light in construction and in which the spool portion makes use of novel means for supporting the coiled rope or cable and for also acting as a support for a rope used for rotating the spool. The spool is rotatably mounted on a shaft that is held against rotation. The shaft is carried by a frame and may be removed therefrom when it is desired to remove the spool from the frame.

A further object of my invention is to provide a device of the type described which is extremely simple in construction and durable and efficient for the purpose intended.

Other objects and advantages will appear in the following specification, and the novel features of the device will be particularly pointed out in the appended claims.

My invention is illustrated in the accompanying drawing forming a part of this application, in which Figure 1 is an end elevation of the device; and Figure 2 is a section along the line 2—2 of Figure 1.

In carrying out my invention I provide a frame indicated generally at 1 and the base 2 of the frame is preferably formed of angle irons. The base 2 has a rear upright indicated generally at A and this upright is formed from four angle irons. Two of the angle irons 3 are connected to the side angle irons 4 of the base 2, and extend upwardly and toward each other. A plate 5 connects the upper ends of the angle irons 3 together. Two other angle irons 6 extend from the rear corners of the base 2 forwardly and are inclined upwardly as shown in Figure 2. The rear angle irons 6 are also inclined toward each other and are secured at their upper ends by a plate 7. The two sets of angle irons 3 and 6 are secured together by plates 8. The plates 5 and 7 have openings 9 and 10 therein, for receiving a shaft 11.

A front upright B is formed from two angle irons 12 that extend from the side angle irons 4 of the base 2 and are inclined toward each other. The angle irons 12 support a cradle 13 at their upper ends. This cradle or half-bearing carries the front end of the shaft 11. The shaft is locked in place by a cotter pin or bolt 14 that is passed through an opening 15 in the shaft and extends on through an opening 16 in the bottom of the cradle. The cotter pin 14 therefore not only locks the shaft to the frame 1, but in addition prevents rotation of the shaft.

The storage spool which is rotatably mounted on the shaft 11, comprises a sleeve 17 that is removably mounted on the shaft. The sleeve carries two discs 18 and 19, and arms 20 and 21, respectively are secured to the discs and radiate therefrom to form two spiders. The arms 20 and 21 form pairs of arms for the storage spool. I have shown the arms formed of pipe sections and each section is flattened at its inner end and is welded or otherwise secured to the disc. I have shown eight arms secured to each disc, although this number may be varied at will.

Transverse horizontally disposed members 22 connect the pairs of arms together and project beyond the arms 21 for forming a rope receiving pulley. The portions of the transverse members extending between the arms 20 and 21 support a cylindrical metal band 25 that constitutes a rope or cable supporting portion of the spool. The rope or cable is coiled around this portion and is confined between the arms 20 and 21.

From the foregoing description of the various parts of the device, the operation thereof may be readily understood.

The spool is mounted on the shaft 11, then the shaft is mounted in the frame 1 and is held in place by the cotter pin or bolt 14. The spool is now free to rotate on the shaft and the cable or rope may be wound thereon or unwound therefrom. The reel or spool may be turned by hand or by means of a crank. The portions 23 and 24 of the transverse members 22 resemble hooks that are for the purpose of receiving a Manila rope for rotating the storage reel. The portions 23 and 24 act in much the same manner as a pulley that is rigidly secured to the side of the spool.

When it is desired to hold the reel against rotation, hooks 26 may be mounted on two of the arms 21 and these hooks are connected by chains 27 with the base 2. The hooks and chains will hold the spool against accidental rotation.

While I have shown only the preferred form of my invention, it should be understood that various changes or modifications may be made within the scope of the appended claims without departing from the spirit of the invention.

I claim:

1. A storage spool comprising a frame, a shaft removably mounted in the frame, a sleeve rotatably mounted on the shaft, arms rigidly connected to the sleeve and extending radially therefrom in pairs, cross members connected to the pairs of arms and being spaced equal distances from the axis of the sleeve, a circular shell disposed between the pairs of arms and being supported by the cross members, said cross members having hook-shaped ends for constituting a pulley for the spool.

2. A spool comprising a sleeve, discs secured thereto, arms connected to the discs and extending radially from the discs, cross members connected to the arms and being spaced equal distances from the sleeve axis, and a shell encircling the portions of the cross members lying between the arms, said members having hook-shaped ends projecting beyond one side of the spool and constituting a pulley around which a rope may be wrapped for rotating the spool when winding a line thereon or vice versa.

3. A storage spool comprising a base, a sleeve rotatably carried thereby, discs carried by the sleeve, arms extending radially from the discs, cross members connecting pairs of arms together, a sheet of material encircling the portions of the cross members lying between the arms, said cross members extending beyond one side of the spool and being formed into hook-shaped ends.

4. In a storage spool, hook-shaped portions extending beyond one side of the spool and forming a pulley around which a rope may be wrapped for rotating the spool when winding a line thereon or unwinding a line therefrom.

5. A storage spool comprising a frame, a reel rotatably carried thereby, cross members extending transversely across the reel and having hook-shaped portions extending beyond one side of the reel and constituting a pulley around which a rope may be wrapped for rotating the reel when winding a line thereon or unwinding a line therefrom.

HENRY ALLYN WOOD.